Sept. 12, 1939. H. M. ROBINSON 2,172,412
BRAKE SIGNAL
Filed Oct. 5, 1936
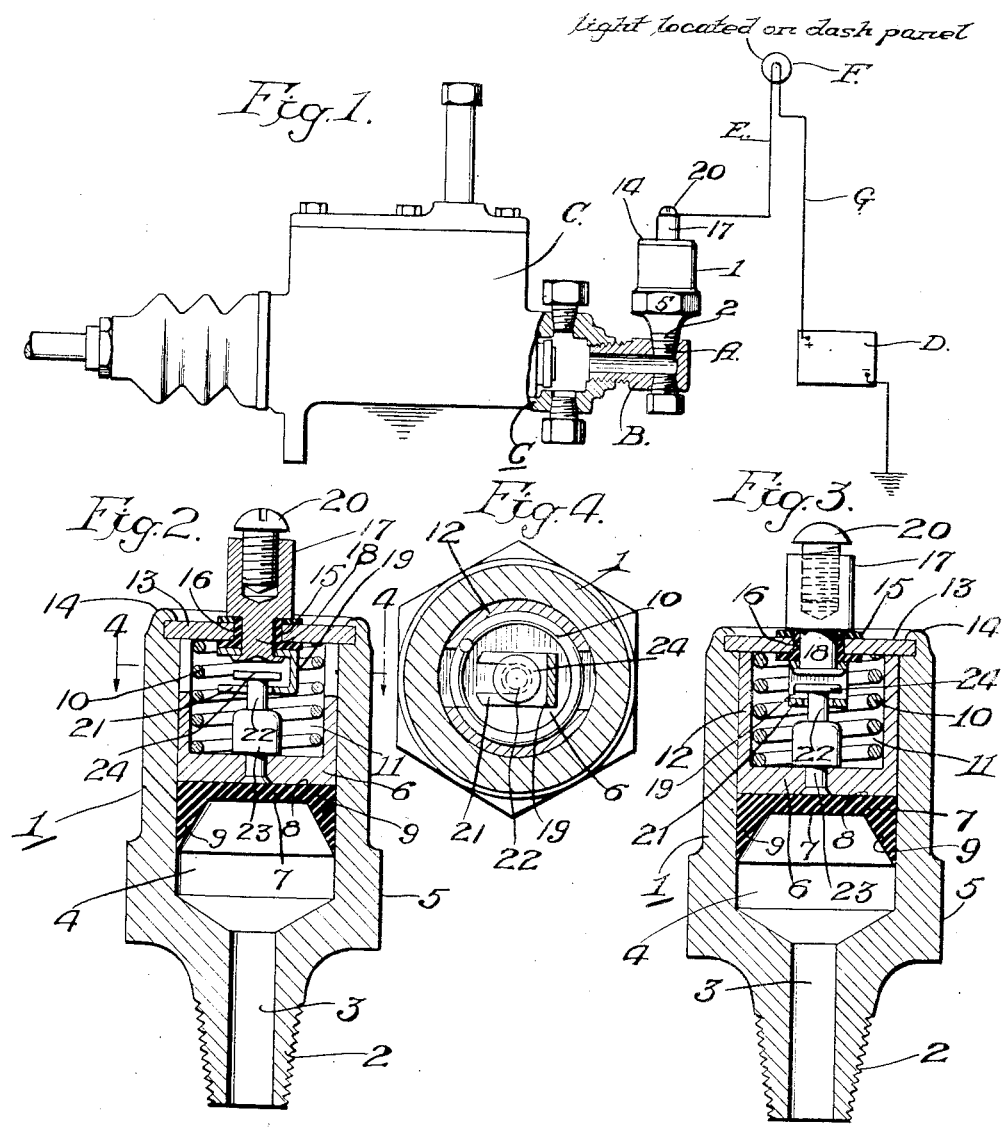
INVENTOR.
Herbert M. Robinson
BY
ATTORNEY.

Patented Sept. 12, 1939

2,172,412

UNITED STATES PATENT OFFICE 2,172,412

BRAKE SIGNAL

Herbert M. Robinson, Newark, N. J., assignor to Reliable Machine Screw Sales Co., Inc., Newark, N. J., a corporation of New Jersey Application October 5, 1936, Serial No. 103,976

2 Claims. (Cl. 200—82)

My invention is an improved device for controlling the operation of a signal to indicate a subnormal pressure in a hydraulic brake system for automobiles.

In the hydraulic brake systems in automobiles in common use, the braking force is transmitted from the brake pedal to a piston which acts upon brake fluid, such as glycerine, in a master cylinder, and the pressure of the piston in the fluid in the cylinder is communicated through suitable tubing to wheel cylinders containing pistons for operating the individual brakes. In such systems the braking fluid is normally maintained at a slight pressure, say from six to ten pounds, when the brakes are inoperative, and such pressure may be increased to several hundred pounds to effect the operation of the brakes. Any drop in the pressure of the liquid in the system below normal is indicative of a leak or other defect in the system likely to result in the failure of the brakes.

The object of my invention is the provision of a simple and inexpensive device which may be readily attached to standard types of hydraulic brake systems to indicate a drop in pressure but which is capable of withstanding the high pressures produced in the application of the brakes when the system is properly functioned.

In its preferred form, my improved device consists of a cup containing a hollow threaded boss suitable for threading into a threaded port of a master cylinder or of a union connected therewith or with the system tubing to make a tight hydraulic joint and a good electrical ground. The cup chamber contains a flexible piston cup having a tapered flange facing toward the passage through the boss and a metallic piston cup having a face contacting throughout its area with the flexible piston cup and having a flange closely fitting the chamber walls and extending oppositely to the flange of the flexible cup. The metallic cup is biased downward by a helical spring housed within the cup and bearing against the end thereof. The opposite end of the spring bears against the inner face of a disk cover or closure which is held in place by spinning the wall of the cup to form a locking flange. The closure has an insulating ferrule therein through which passes the shank of an electric terminal. The head of the shank is upset to form a rivet for securing against the insulating bushing a U-shaped contact member having a bifurcated leg for the passage of the stem of a contact member which is secured to the metallic piston and provided with a head for engagement with the legs of the bifurcated contact when the piston is in the lowermost position thereof.

The tension of the spring is such that it is overcome by the normal pressure of the brake fluid so that the flanged sides of the metallic piston normally engage the cap, and consequently there is no movement of the movable parts upon the increase of the pressure in applying the brakes, hence no accidental engagement between the upset head of the terminal shank and the head of the contact on the piston. Leakage into the contact chamber is prevented by the distension of the tapered flange of the piston washer against the sides of the chamber. If, however, the pressure in the system should fall below normal, the biasing action of the coiled spring moves the piston downward and brings the head of the movable contact into engagement with the bifurcated legs of the fixed contact so as to establish a circuit through an alarm.

The characteristic features and advantages of my improvements will further appear from the following description and the accompanying drawing in illustration of a preferred embodiment of my invention.

In the drawing, Fig. 1 is a side elevation of a control device embodying my invention attached to a diagrammatically illustrating master cylinder and alarm system; Fig. 2 is a vertical elevation on an enlarged scale of the control device shown in Fig. 1; Fig. 3 is a vertical sectional view taken at right angles to the view shown in Fig. 2; and Fig. 4 is a transverse sectional view taken on the line 4—4 of Fig. 2.

As illustrated in the drawing, my invention is shown mounted in the threaded socket A of a coupling B attached to the master cylinder C of a hydraulic brake system which is electrically connected through ground to a terminal of a battery D. My improved control mechanism consists of a cup shaped fitting 1 having at one end thereof a tapered threaded boss 2 containing a longitudinal passage 3 communicating with the chamber 4 of the fitting, which is preferably of cylindrical cross-section. The portion 5 of the fitting immediately above the boss 2 is cut to hexagonal form for the convenient application of a tool for screwing the boss into the socket A.

A hollow rigid metallic piston 6 makes a close slip fit within the chamber 4 and a piston cup 7 engages the flat face 8 of the piston. The piston cup is formed a flexible material, such as leather or rubber, and has a flange 9 tapering outwardly and downwardly toward the mouth of the passage 3.

A helically coiled spring 10 is seated on the head of the piston 6 and within the cylindrical chamber 11 formed by the flange 12 of the piston, and preferably has substantially the diameter of the chamber 11. The spring is compressed between the piston 6 and the disk 13 which is secured in place by a lip 14 spun over from the wall of the fitting 1.

A non-conducting ferrule 15 is seated in an aperture 16 in the disk 13 and has flanges partially overlying the top and bottom surfaces of this disk. A conducting stud 17 has a reduced shank 18 which passes through the ferrule 15 and through an aperture in one leg of a U-shaped conducting member 19, and has its end upset to secure together the stud 17, cap 13 and U-shaped member 19. The stud 17 is tapped for the insertion of a binding screw 20 for the attachment of a conductor E which is connected with a signal such as the lamp F. The signal is connected through the conductor G with the battery D.

The U-shaped member 19 has a bifurcated leg 21 through which passes the neck 22 of a stud 23 riveted to the head of the piston 6 and having a conducting head 24 adapted to make contact with the bifurcated member 21 when the piston is biased downward by its spring. The upper part of the cylindrical wall of the piston 6 contains opposite recesses 22 to facilitate the assembly of the device by permitting the bifurcations of the member 19 to be inserted beneath the head 24 and on opposite sides of the neck 22 after the latter has been secured to the piston 6 and the member 19 has been secured to the cap 13.

It will be understood that when the boss 2 is screwed into the socket A, the normal pressure of the fluid braking system is communicated through the passage 3 into the cylindrical chamber 4 within the cup or housing 1. Such pressure acting against the piston formed by the cups 6 and 7 elevates such pistons against the biasing action of the spring 10. The head 24 of the contact 22 is thereby lifted out of engagement with the bifurcated member 21. Since the neck 22 is of less width than the space between the legs of the bifurcated member 21, and since the upward movement of the piston and head 24 is stopped by the engagement of the wall 12 with the cap 13 before the head 24 engages the head 18, the circuit through the signal F is broken so long as there is sufficient fluid pressure to overcome the biasing action of the spring 10. Should the pressure fall abnormally low, the spring 10 expands, depresses the piston and the engagement of the head 24 with the bifurcated member 21 closes the circuit, thereby lighting the lamp F as a warning that the braking system is inoperative.

Having described my invention, I claim:

1. In a brake signal, a housing having a port adapted to communicate with a fluid pressure braking system, a piston having oppositely extending flanges movable in said housing, a coil spring housed within one of said flanges and biasing said piston in one direction against the action of the pressure communicated through said port, a contact carried by said housing and having a bifurcated member, and a contact normally insulated from said first named contact and carried by said piston and having a member normally disposed between the bifurcations of said first named contact member, said second named contact being movable into circuit closing engagement with said first named contact by the movement of said piston by said spring against the action of the pressure communicated through said port.

2. In a brake signal, a hollow cup having a boss containing a passage, a piston in said cup and including a rigid cup having a wall limiting movement of the piston in one direction, said piston also including a flexible cup having a wall projecting in the opposite direction from the wall first named, a spring in said piston and biasing it in one direction, a contact including a head and a bifurcated member carried by said housing, and a contact having a shank normally disposed between the bifurcations of said member and a head normally disposed between said first named head and said bifurcated member and movable by the expansion of said spring into engagement with said bifurcated member.

HERBERT M. ROBINSON.